United States Patent [19]
Renzelmann et al.

[11] Patent Number: 5,350,135
[45] Date of Patent: Sep. 27, 1994

[54] LATCH PIN INHIBITOR FOR FOLDING WING-TIP AIRCRAFT

[75] Inventors: Michael E. Renzelmann, Woodinville; Mark H. Smith, Vashon Island, both of Wash.

[73] Assignee: The Boeing Company, Seattle, Wash.

[21] Appl. No.: 45,903

[22] Filed: Apr. 12, 1993

Related U.S. Application Data

[63] Continuation-in-part of Ser. No. 828,308, Jan. 30, 1992, Pat. No. 5,201,479.

[51] Int. Cl.[5] .............................................. B64C 3/56
[52] U.S. Cl. .................................................... 244/49
[58] Field of Search ................. 244/218, 49, 120, 124, 244/335; 292/144, 302; 92/16, 14, 23, 29, 24, 20; 116/124; 280/414

[56] References Cited

U.S. PATENT DOCUMENTS

| | | | |
|---|---|---|---|
| Re. 22,435 | 2/1944 | Evans | 116/124 |
| 2,280,809 | 4/1942 | Evans | 116/124 |
| 3,425,731 | 2/1969 | Elmore | 292/335 |
| 3,989,267 | 11/1975 | Robinson | 280/414 |
| 4,225,004 | 9/1980 | Lipshield | 292/144 |

FOREIGN PATENT DOCUMENTS 635260 4/1950 United Kingdom .

*Primary Examiner*—Galen L. Barefoot
*Attorney, Agent, or Firm*—Joan H. Pauly

[57] ABSTRACT

A folding wing tip (14) on an aircraft (2) carries a lug (16) that moves into alignment with lugs (6, 10) on the inboard wing portion (4) as the wings spread. The lug (16) pivots an inhibitor (28) that is interconnected by linkage to a valve spool (122). The pivoting of the inhibitor (28) causes the spool (122) to shift its position so that a sense port is brought into communication with a return port. Return pressure in the sense port indicates a spread wing condition. When the wing tip (14) is folded, springs move the inhibitor (28) and the valve spool (122) back to their original positions. This communicates the sense port with a pressure port to indicate a folded wing condition. The spool (122) is preferably also biased into its original position by fluid pressure. In addition, the lug (16) has a cam (92) that engages a roller (84) carried by the inhibitor (28) when the wing tip (14) is moved into a folded position. Abutment of the cam (92) and roller (84) pivots the inhibitor (28) back into its original position.

28 Claims, 10 Drawing Sheets

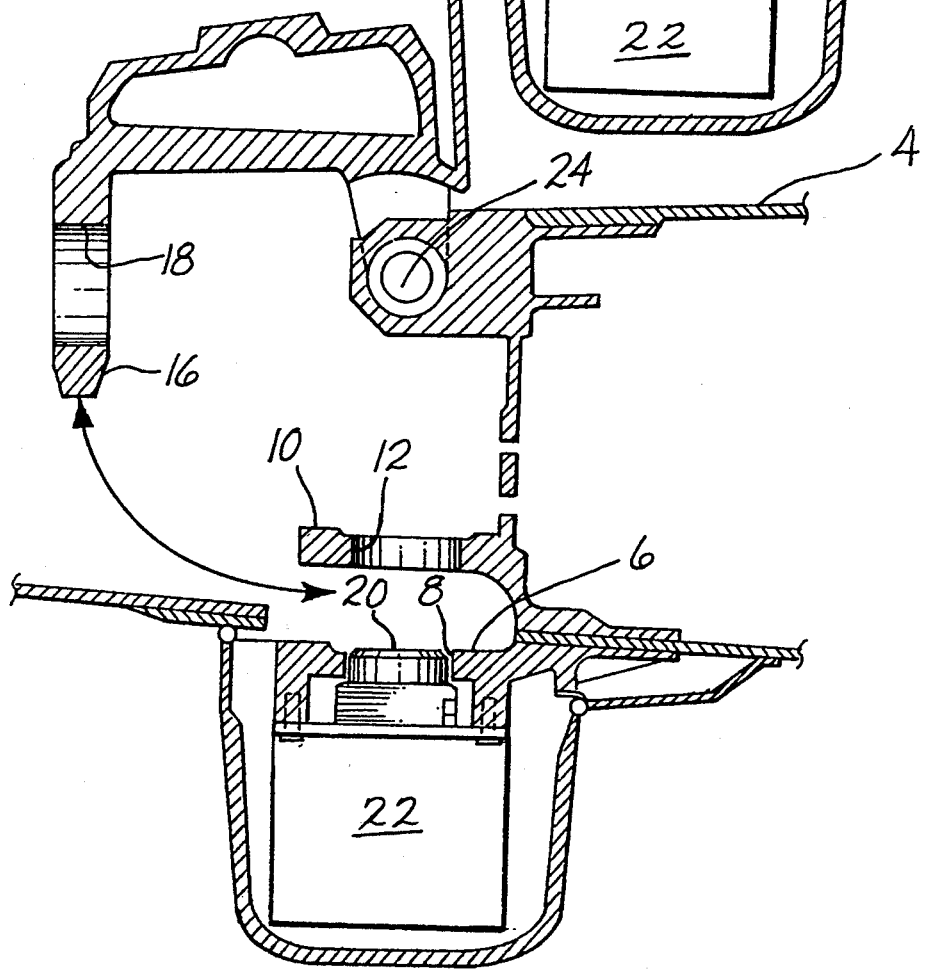

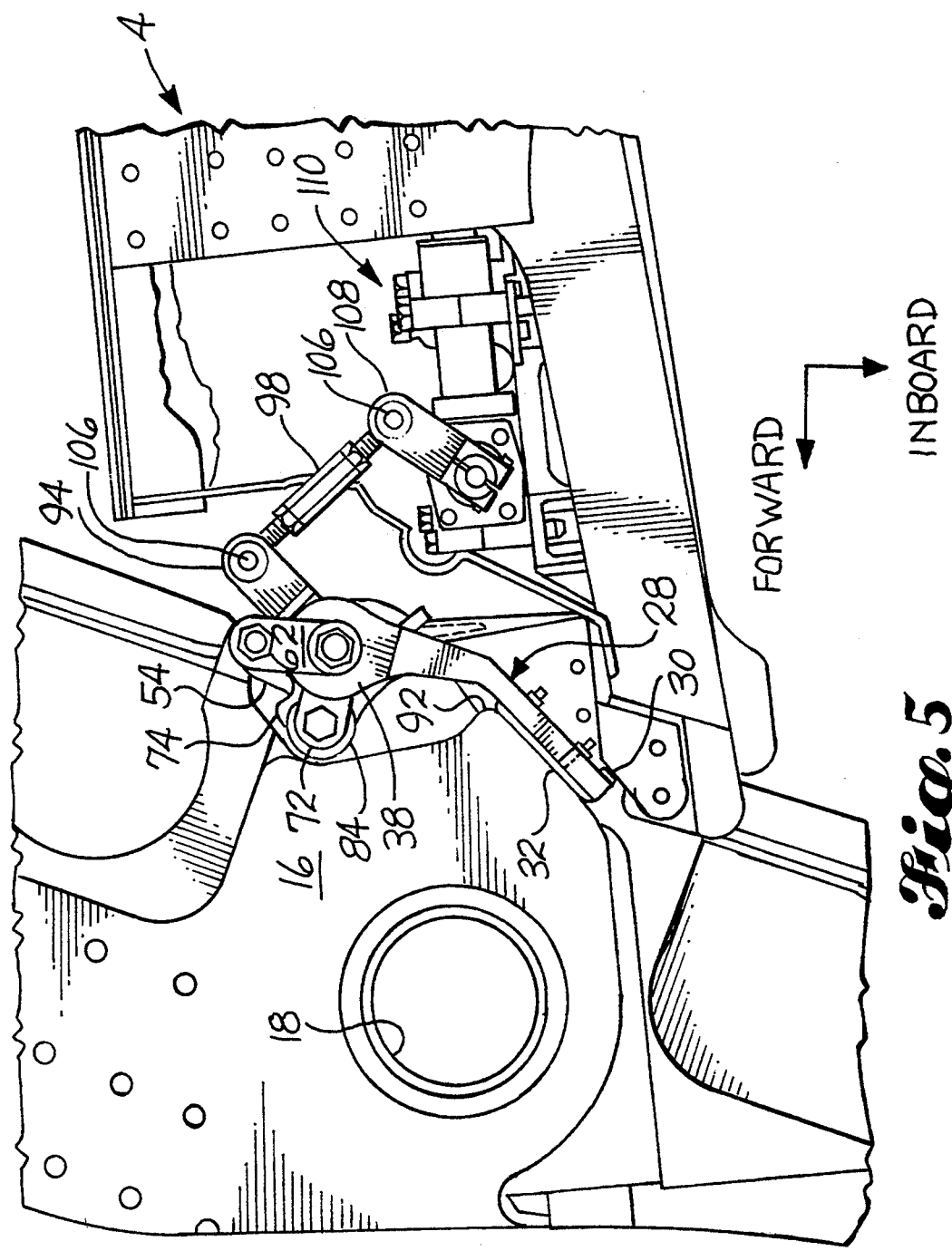

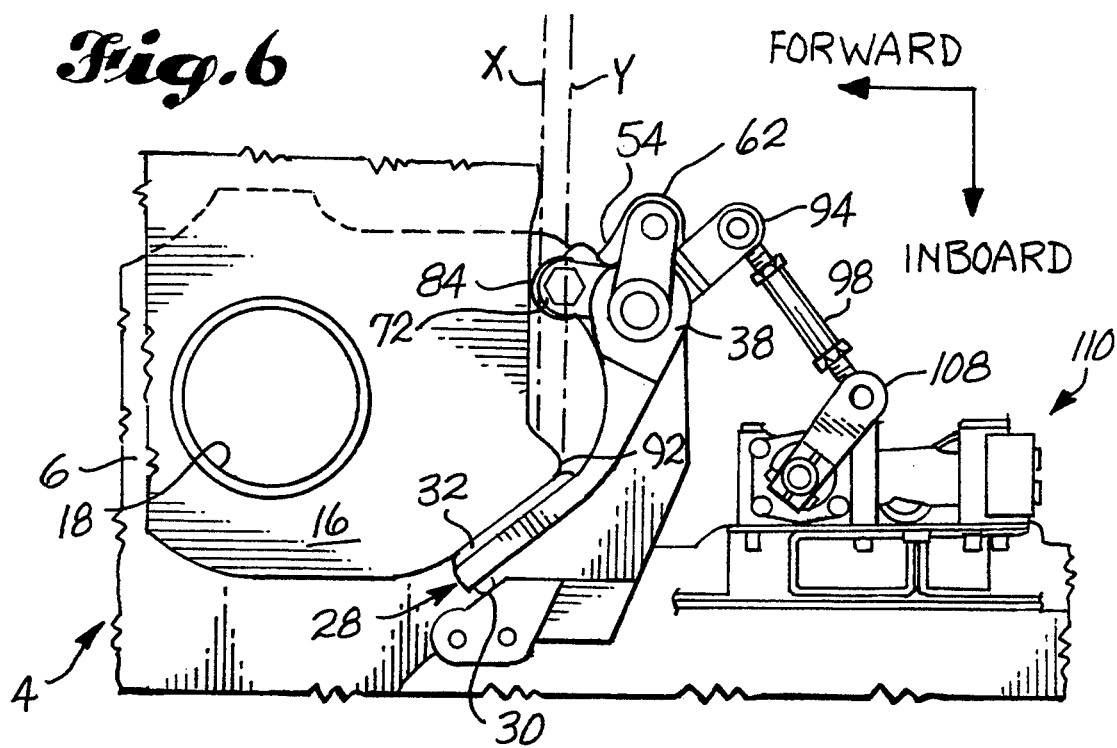
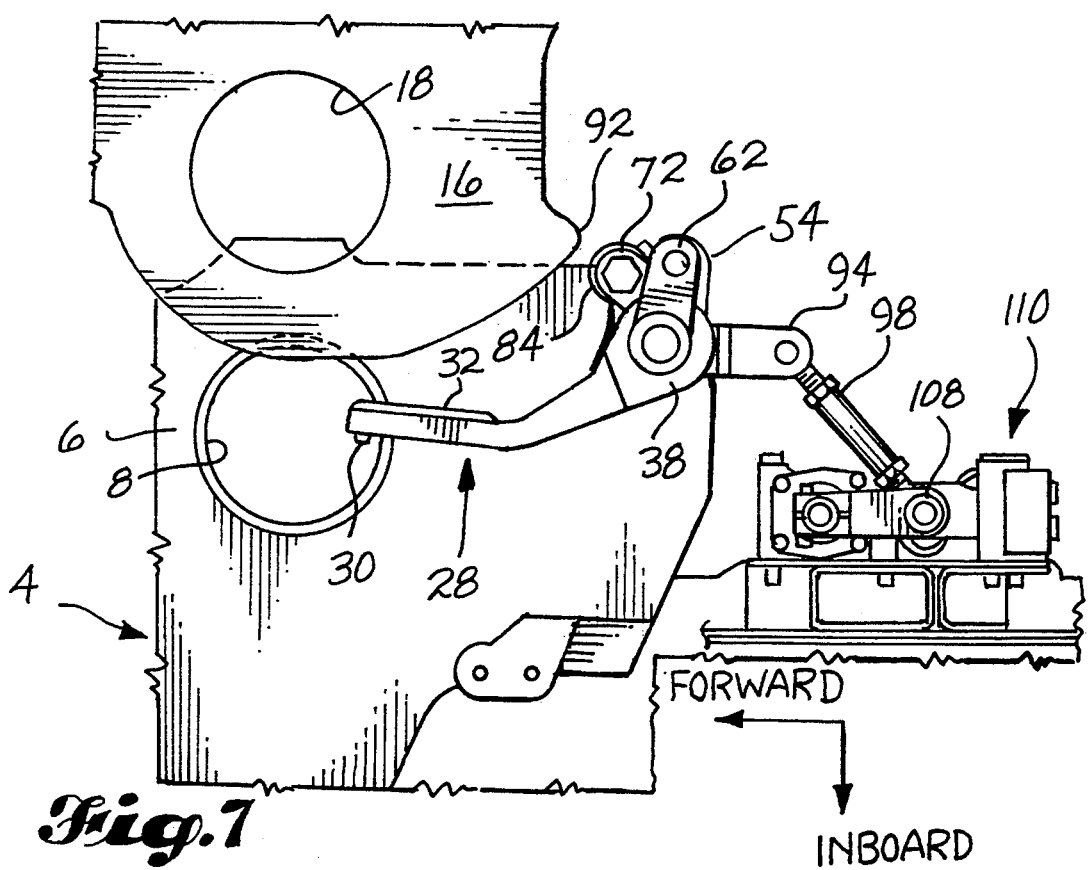

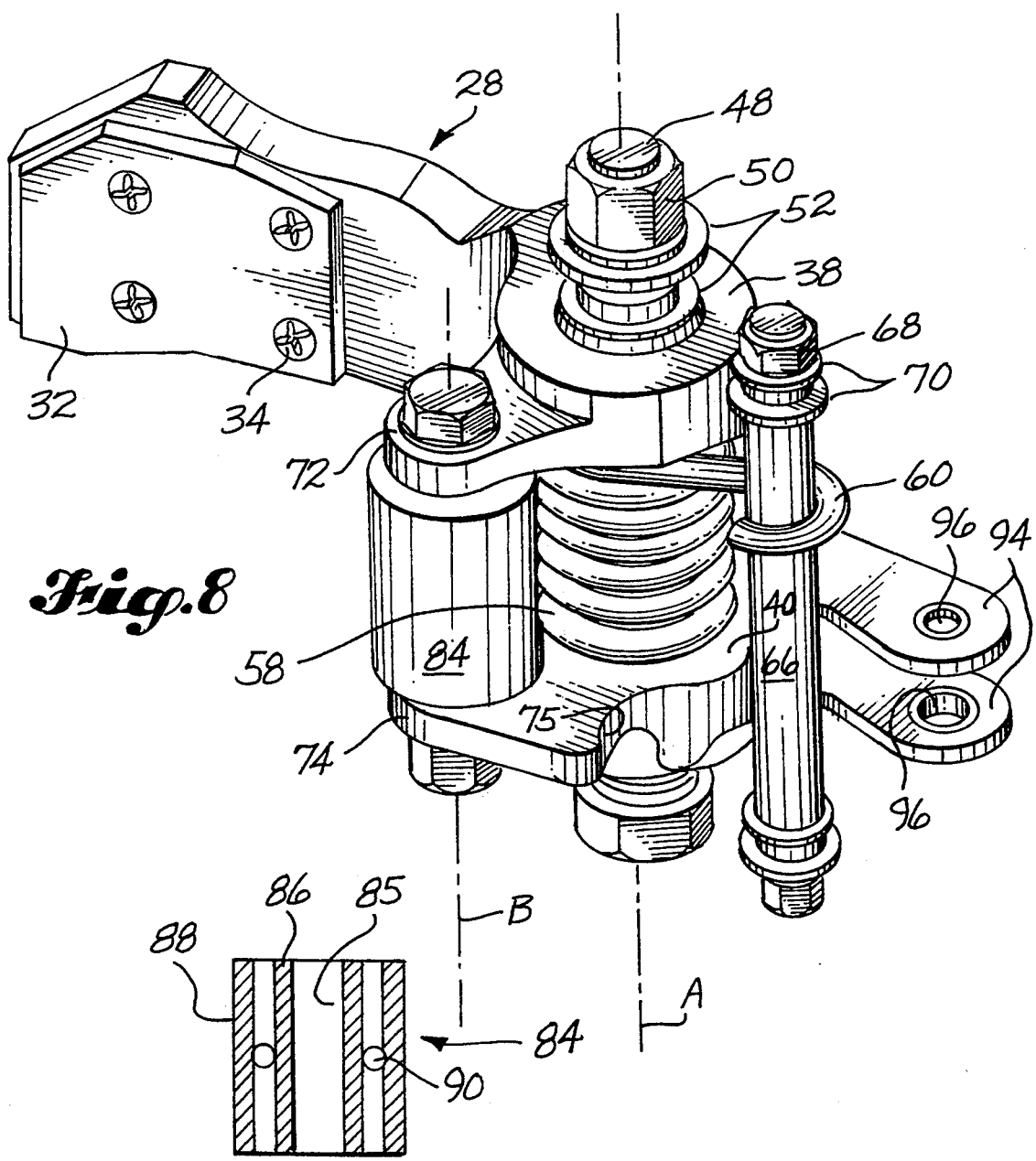

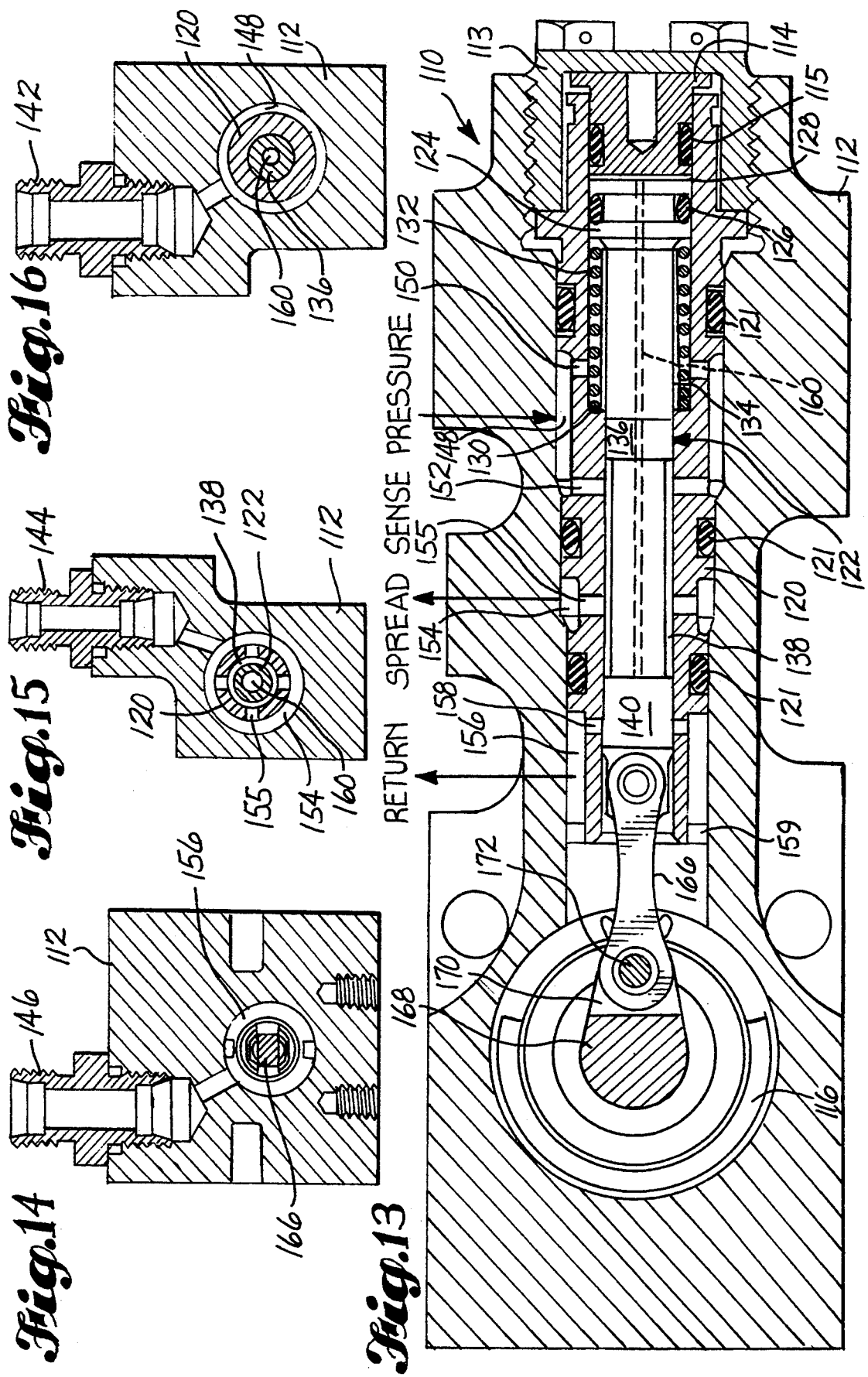

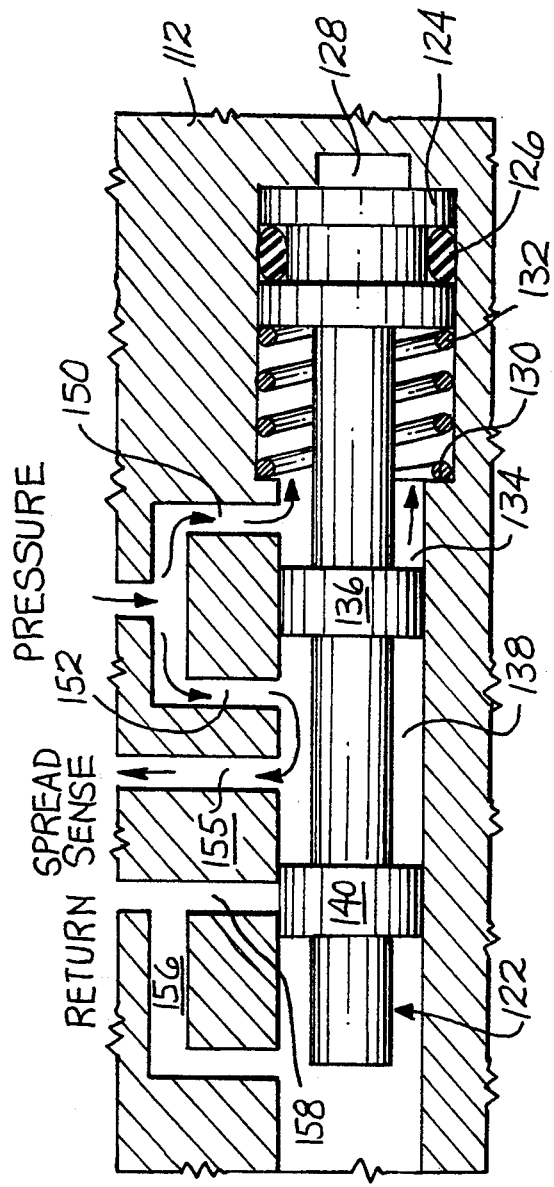
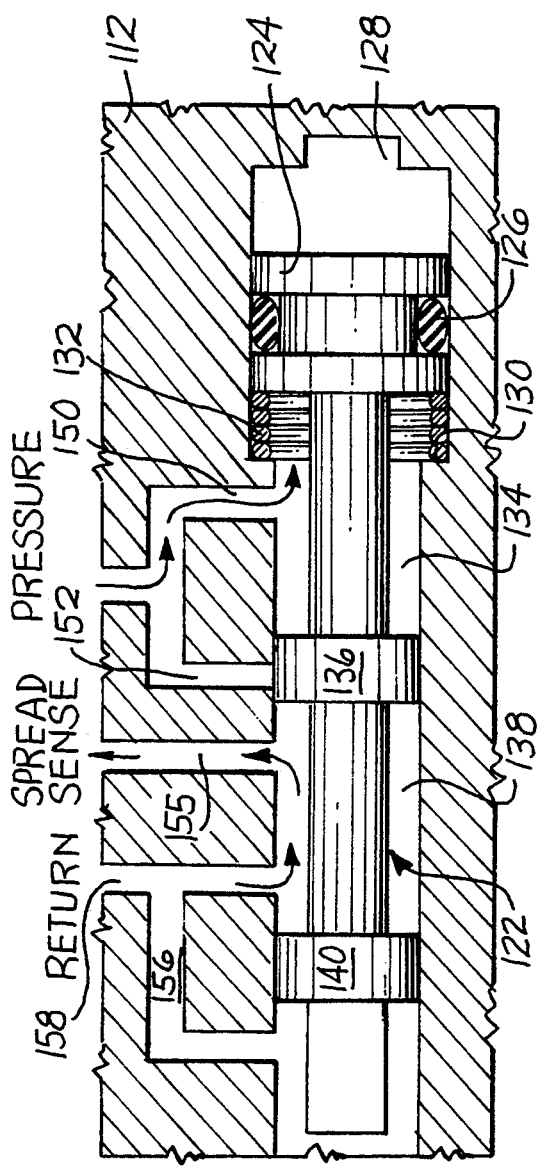
Fig.17
Fig.18

LATCH PIN INHIBITOR FOR FOLDING WING-TIP AIRCRAFT

This application is a continuation-in-part of application Ser. No. 07/828,308, filed Jan. 30, 1992, now U.S. Pat. No. 5,201,479, issued Apr. 13, 1993.

TECHNICAL FIELD

This invention relates to mechanisms for inhibiting premature extension of latch pins and for sensing proper spread position in aircraft folding wing-tip systems and, more particularly, to an inhibitor that is moved out of an inhibit position by a wing-tip portion moving into a spread position and that is mechanically linked to a valve member of a spread valve to move said valve member and thereby change the pressure level in a sense port of the valve.

BACKGROUND INFORMATION

The space required by an aircraft when it is supported by the ground or a structure may be reduced by folding outer portions of the wings to be generally perpendicular to the main wing span. Folding wing-tip aircraft have been used by the military on aircraft carriers to reduce the space required by the aircraft when they are on the carrier. Since unintended folding of the wing tips during flight could be catastrophic, the known military aircraft are provided with a safety system designed to ensure that the wings are fully spread and locked into a spread condition before the aircraft takes off. The safety system relies heavily on a red flag located on each wing. A protruding red flag indicates that the wings are not properly spread.

Each wing tip of the military aircraft is hinged to the main portion of the wing and has a plurality of latch pins for locking the wing tip into a spread position. Each latch pin is provided with an inhibitor, commonly known as a "porkchop" because of its shape, that prevents extension of the latch pin into a latch position when the wing is in a folded condition. In the operation of the system, the pilot lowers a lever about half way to spread the wings. As the wings spread, lugs carried by the wing portions push the inhibitors out of their blocking position. Once the wings are spread, the pilot flips a toggle switch to latch the latch pins and then lowers the lever the remainder of its travel to lock the latch pins. Finally, he verifies that the red flag on each wing is not visible. The flags are mechanically linked to the latch pin locks and are retracted as the locks are activated. The looks are blocked from moving into their locked position when the latch pins are retracted.

In the military system, failure to achieve proper spread condition will be indicated by the flag on a wing if at least one of the inhibitors on the wing is in a non-failed operational condition. A protruding flag is clearly visible to the flight crew and ground crew. In addition, the configuration of the aircraft makes the wing tips visible from the flight deck so that the flight crew can verify the position of the warning flags even in bad weather. Beyond the inhibitors and flags, the system is dependent on intense flight and ground crew inspections to verify that the wings are properly spread before takeoff. In an aircraft carrier environment, reliance on such inspections is practical since it is standard procedure to have a number of ground personnel checking every detail of an aircraft just prior to takeoff.

The commercial airline industry is highly competitive, and airlines are always searching for ways to increase passenger volume and more efficiently move a given number of passengers from one airport to another. One of the main limitations on increasing passenger volume is the limited number of gates available at any given airport. This limitation has led to a trend to use larger aircraft so that each gate can service a greater number of passengers. The use of larger aircraft to increase passenger volume presents a new problem. The larger aircraft tend to have much larger wing spans than the aircraft that were commonly in use when the gates were built. In a typical gate arrangement, the larger wing span aircraft require more space than is allotted to an individual gate and, thus, the use of such aircraft would tend to reduce the number of usable passenger gates. The assignee of the present applicants has proposed the introduction of folding wing-tip commercial aircraft to solve the problem of limited space at each passenger gate so that passenger volume per gate can be increased without reducing the number of usable gates.

Experience with folding wing-tip military aircraft has provided some guidance in the design of the proposed commercial folding wing-tip aircraft. However, the usefulness of the military aircraft as a guide is limited because of the different use environments and safety requirements relating to military and commercial aircraft. It is anticipated that a commercial aircraft with folding wing tips would not move the wing tips into a spread condition until the aircraft reached the threshold of an active runway. This procedure would provide optimal use of limited width taxiways as well as limited width gate areas. Since ground personnel are not available at runway thresholds, a commercial folding wing-tip aircraft could not rely on ground crew inspections as part of safety procedures for ensuring a proper spread wing condition. In addition, the wing tips of larger commercial aircraft are not visible from the flight deck. Thus, the military warning flag system would have no practical value in the commercial aircraft environment. These considerations and the very rigorous safety requirements that apply to commercial aircraft have necessitated a search for novel approaches to the design of the various aspects of a folding wing-tip system in a commercial aircraft.

DISCLOSURE OF THE INVENTION

The present invention was conceived as part of an effort to design a folding wing-tip aircraft that is both reliable and practical in a commercial aviation environment. However, it also has potential application in connection with other types of structures, i.e. structures other than folding wing structures, that are hingedly connected to each other. The invention addresses the specific problems of reliably detecting a spread condition of the structures and of ensuring proper sequencing of spread procedures.

A broad subject of the invention is apparatus for sensing a spread position of first and second structures that are hingedly connected to each other. The apparatus includes an inhibitor, a spread valve, and linkage. The inhibitor is positioned so that it is engaged by one of the structures, as the structures move toward a spread position, and is moved thereby into an engaged position. The linkage interconnects the inhibitor with a valve member of the spread valve. Movement of the inhibitor into the engaged position mechanically moves the valve member from a first position to a second position to bring a sense port into communication with another port in the valve.

According to an aspect of the invention, the apparatus for sensing spread position is provided in a system of a type having first and second structures that are hingedly connected to each other and that include first and second lugs, respectively. Each lug has an opening, and the lugs are movable relative to each other along a spread pathway between a folded position and a spread position in which the openings are aligned for receiving a latch pin. The apparatus comprises an inhibitor, a spread valve, and linkage. The inhibitor is pivotably mounted on the first structure to pivot between an inhibit position in which it extends into the spread pathway and an engaged position. The inhibitor is positioned to be engaged by the second lug, as the lugs move from the folded position to the spread position, and to be moved thereby from its inhibit position to its engaged position. The spread valve has a sense port, a pressure port, a return port, and a valve member. The valve member is movable between a first position and a second position. In the first position, the sense port is in communication with one of the pressure and return ports and is closed from communication with the other of these two ports. In the second position, the communication with and closure from communication with the sense port are reversed. The linkage interconnects the inhibitor with the valve member to cause the valve member to be mechanically moved from its first position to its second position by movement of the inhibitor from the inhibit position to the engaged position.

According to another aspect of the invention, the apparatus for sensing spread position described above is provided in an aircraft folding wing system. The apparatus has the characteristics described above, with the two structures being first and second wing portions hingedly connected to each other. In a folding wing system, and in other types of systems, the apparatus of the invention may be provided with one or more additional preferred or optional features, such as those described below.

A preferred feature of the apparatus is a first abutment surface carried by the second lug and a second abutment surface mounted to pivot with the inhibitor. The first abutment surface is positioned to be brought into abutment with the second abutment surface, as the lugs move toward the folded position, to move the inhibitor into its inhibit position. This preferred feature provides automatic resetting of the inhibitor upon movement of the structures to the folded position to, thereby, avoid incorrect sensing of the spread position. In its preferred form, the first abutment surface comprises a cam surface, and the second abutment surface comprises an outer surface of a roller. In the most preferred embodiment, the inhibitor is mounted to pivot between the inhibit position and the engaged position about a pivot axis. The roller is freely rotatable about a roller axis substantially parallel to the pivot axis and pivots about the pivot axis along with the inhibitor.

The location of the inhibit position of the inhibitor may be varied as long as it is such that the inhibitor will be engaged by the second lug as the lugs move into the spread position. Preferably, in its inhibit position, the inhibitor extends over a portion of the opening in the first lug to inhibit movement of a latch pin through the opening in the first lug. This prevents extension of the latch pin When the wing portions or other structures are in a folded condition.

The sense port may be communicated with either the pressure port or the return port to sense the spread position of the lugs. In the preferred embodiment, the sense port is in communication with the pressure port when the valve member is in its first position, i.e. when the structures are folded. This arrangement helps prevent a false indication of spread position if there is a failure in the spread valve and pressure leaks into the sense port.

Further protection against a false spread signal is preferably provided by biasing the inhibitor into its inhibit position. This can be accomplished by providing a spring that engages the inhibitor to bias it into its inhibit position. Instead of, or in addition to, providing biasing means for the inhibitor, the apparatus may comprise means carried by the second lug for engaging the inhibitor and moving the inhibitor into its inhibit position as the lugs move toward the folded position. An example of such a means is the abutment surface arrangement described above.

The valve is also preferably provided with additional features that help ensure the accuracy of a sensed spread condition. For example, the valve preferably includes biasing means for biasing the valve member into its first position. The valve member may be biased by providing a spring that engages the valve member. Alternatively, the valve member may be provided with opposed pressure surfaces that are continuously exposed to the pressure port and the return port, respectively, to continuously urge the valve member toward its first position. In the preferred embodiment, the valve includes both a spring that engages the valve member and opposed pressure surfaces to provide redundant mechanical and fluid pressure protection against an erroneous sensing of a spread condition.

Another broad subject of the invention is apparatus for inhibiting premature extension of a latch pin in an aircraft folding wing system of a type having first and second wing portions hingedly connected to each other and including first and second lugs, respectively. Each lug has an opening, and the lugs are movable relative to each other between a folded position and a spread position in which the openings are aligned for receiving the latch pin. According to an aspect of the invention, the apparatus comprises an inhibitor pivotably mounted on the first portion to pivot between an inhibit position and an engaged position. In the inhibit position, the inhibitor extends over a portion of the opening in the first lug to inhibit extension of the latch pin through the opening in the first lug. The inhibitor is positioned to be engaged by the second lug, as the lugs move from the folded position to the spread position, and to be moved thereby from the inhibit position to the engaged position. The apparatus also includes a first abutment surface carried by the second lug, and a second abutment surface mounted to pivot with the inhibitor. The first abutment surface is positioned to be brought into abutment with the second abutment surface, as the lugs move toward the folded position, to move the inhibitor into its inhibit position. Preferably, the first and second abutment surfaces comprise a cam surface and an outer surface of a roller, as described above.

The invention provides extremely reliable apparatus for inhibiting premature extension of a latch pin and sensing a fully spread condition in an aircraft folding wing system. In addition to being reliable, the apparatus is suitable for use in a commercial aircraft environment. The invention avoids the dependence, found in the military system, on visual inspections by flight and ground crew. This is important in the commercial environment since visual inspections are impractical, as discussed above. Instead of relying on visual inspections to verify that the spread procedure has been carried out properly, folding wing systems constructed in accordance with the invention provide direct automatic indication of spread position through mechanical linkage of a valve with a latch pin inhibitor. This arrangement permits the use of a single inhibitor along a hinge with multiple latch pins to reduce the size and weight of the folding and sensing mechanism. The reduction in size and weight can be achieved while maintaining several levels of safety since the apparatus of the invention is highly flexible and may easily be provided with a number of safety features for ensuring accurate sensing of the spread condition.

The feature of providing the second lug with means for engaging the inhibitor to return the inhibitor to its inhibit position makes the apparatus of the invention especially suitable to a commercial environment since it greatly reduces the maintenance requirements of the apparatus. As noted above, the apparatus is preferably provided with means for biasing the inhibitor into its inhibit position. In the military environment, the spring biasing the porkchop is lubricated about every twenty-eight days. Such a maintenance schedule is highly impractical in a commercial environment. Thus, the positive return of the inhibitor by the folding of the wing portions is important since it permits lubrication to be carried out less often. If the inhibitor tends to stick in its engaged position because of the length of time since the last lubrication, the tendency to stick will be overcome by the positive action of the second lug engaging the inhibitor.

These and other advantages and features of the invention will become apparent from the detailed description of the best mode for carrying out the invention that follows.

BRIEF DESCRIPTION OF THE DRAWINGS

In the drawings, like element designations refer to like parts throughout, and:

FIG. 2 is a sectional view of a portion of one of the wings shown in FIG. 1, illustrating the hinge in a spread position and latched by a latch pin.

FIG. 3 is like FIG. 2 except that it shows the latch pin retracted and the hinge in a folded position.

FIG. 5 is a top plan view of the wing portion and preferred embodiment of the invention shown in FIG. 4, with a wing tip lug moved into latching position and upper portions of the wing omitted.

FIGS. 6 and 7 are schematic plan views of the apparatus shown in FIG. 5, illustrating the spread position of the apparatus and the folded position of the apparatus, respectively.

FIG. 8 is a pictorial view of a preferred embodiment of the inhibitor and associated structure of the invention.

FIG. 9 is a sectional view of the roller shown in FIG. 8.

FIGS. 13–16 are sectional views taken along the lines 13—13, 14—14, 15—15, and 16—16, respectively, in FIG. 12.

FIG. 17 is a schematic sectional view of the valve shown in FIGS. 11–16 with the valve spool in a first position corresponding to a folded condition of the associated wing tip.

FIG. 18 is like FIG. 17 except that the valve spool is in its second position corresponding to the spread condition of the wing.

BEST MODE FOR CARRYING OUT THE INVENTION

Figure 1:
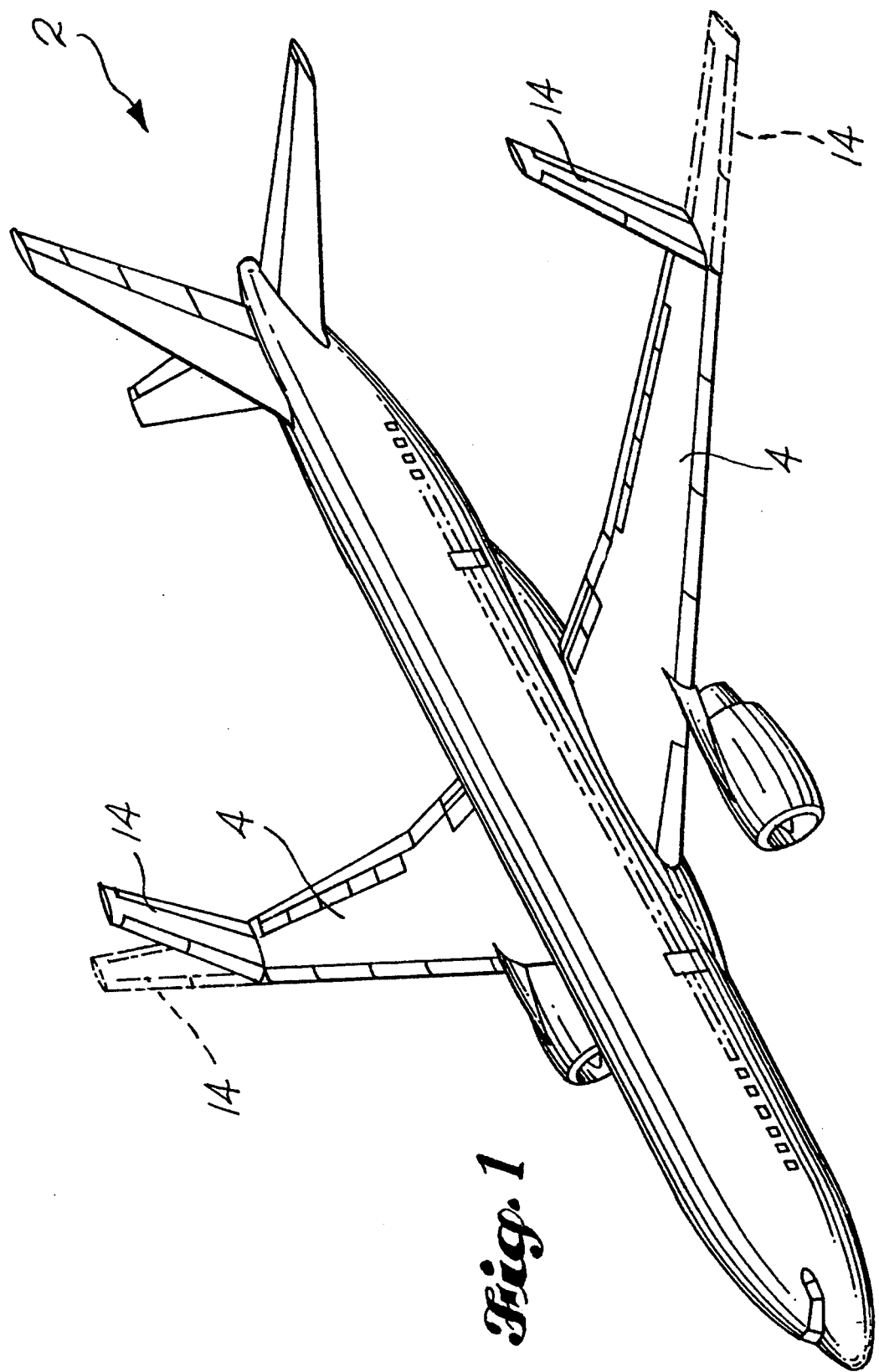
FIG. 1 is a pictorial view of an aircraft having folding wing tips.

The drawings show apparatus that is constructed in accordance with the invention and that constitutes the best mode for carrying out the invention currently known to the applicants. In the drawings, the apparatus is shown as part of a folding wing-tip system. It is anticipated that the primary use of the invention will be in such a system. However, it is intended to be understood that the apparatus of the invention may also be advantageously incorporated into other types of systems in which there is a need to reliably determine the relative position of two structures with respect to each other.

FIG. 1 shows a commercial passenger aircraft 2 with folding wings. Each wing has an inboard portion 4 and an outer wing-tip portion 14. The wing tip 14 is hingedly connected to the inboard portion 4. A folded position of the wing tip 14 is shown in solid lines, and the spread position is shown in broken lines. It is anticipated that the apparatus of the invention will be incorporated into the type of aircraft 2 shown in FIG. 1.

Figure 4:
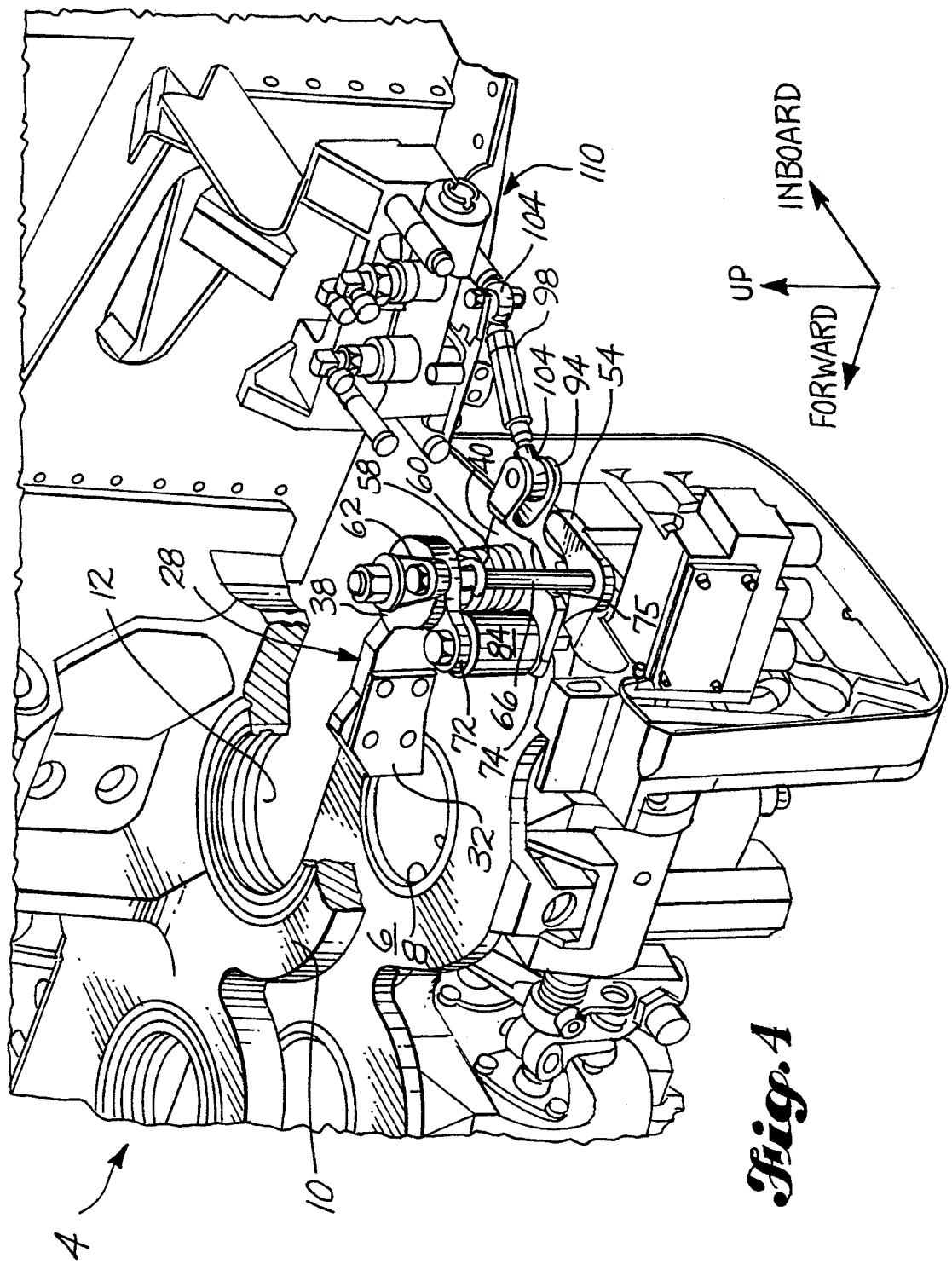
FIG. 4 is a fragmentary pictorial view of the inboard wing portion shown in FIGS. 2 and 3 and the preferred embodiment of the invention.

Referring to FIGS. 2–4, the two portions 4, 14 of each wing are connected to each other along a hinge 24 that extends substantially the entire chord length of the wing at the hinge location. When the wing is in a spread condition, a plurality of latch pins 20 secure the two portions 4, 14 together. At each latch pin location, the inboard wing portion 4 has two spaced lugs 6, 10 with aligned openings 8, 12. The wing-tip portion 14 has a corresponding lug 16 with an opening 18. When the wing is spread, the openings 8, 12, 18 in the three lugs 6, 10, 16 are aligned and receive the latch pin 20, as shown in FIG. 2. FIG. 3 illustrates the latch pin 20 retracted and the wing-tip portion 14 pivoted into the folded position shown in solid lines in FIG. 1. The mechanism for extending and retracting the latch pin 20 and locking the latch pin 20 in place does not form a part of the present invention and is shown schematically as box 22 in FIGS. 2 and 3.

Referring to FIG. 4, the apparatus of the invention is preferably mounted adjacent to the aftmost latch pin location on the inboard wing portion 4. The preferred embodiment of the apparatus of the invention is shown in FIGS. 4–18. The apparatus includes an inhibitor 28, shown in FIGS. 4–10. The inhibitor 28 is pivotably mounted on the inboard wing portion 4 to pivot about a pivot axis A (FIG. 8) between an inhibit position and an engaged position. In its inhibit position, the inhibitor 28 is positioned to be engaged by the lug 16 on the wing-tip portion 14 as the wing portions 4, 14, and the lugs 6, 10, 16 carried thereby, move from their folded position to their spread position. Preferably, the inhibitor 28 extends over a portion of the opening 8 in the lug 6 when it is in its inhibit position, to inhibit movement of the latch pin 20 through the opening 8. This preferred inhibit position is shown in FIGS. 4 and 7. As the wings are spread, the wing-tip lug 16 moves between the inboard lugs 6, 10 and thereby engages the inhibitor 28 and moves it into the engaged position illustrated in FIGS. 5 and 6. This permits the latch pin 20 to be extended through the three aligned openings 8, 12, 18 when the wings are fully spread.

Figure 10:
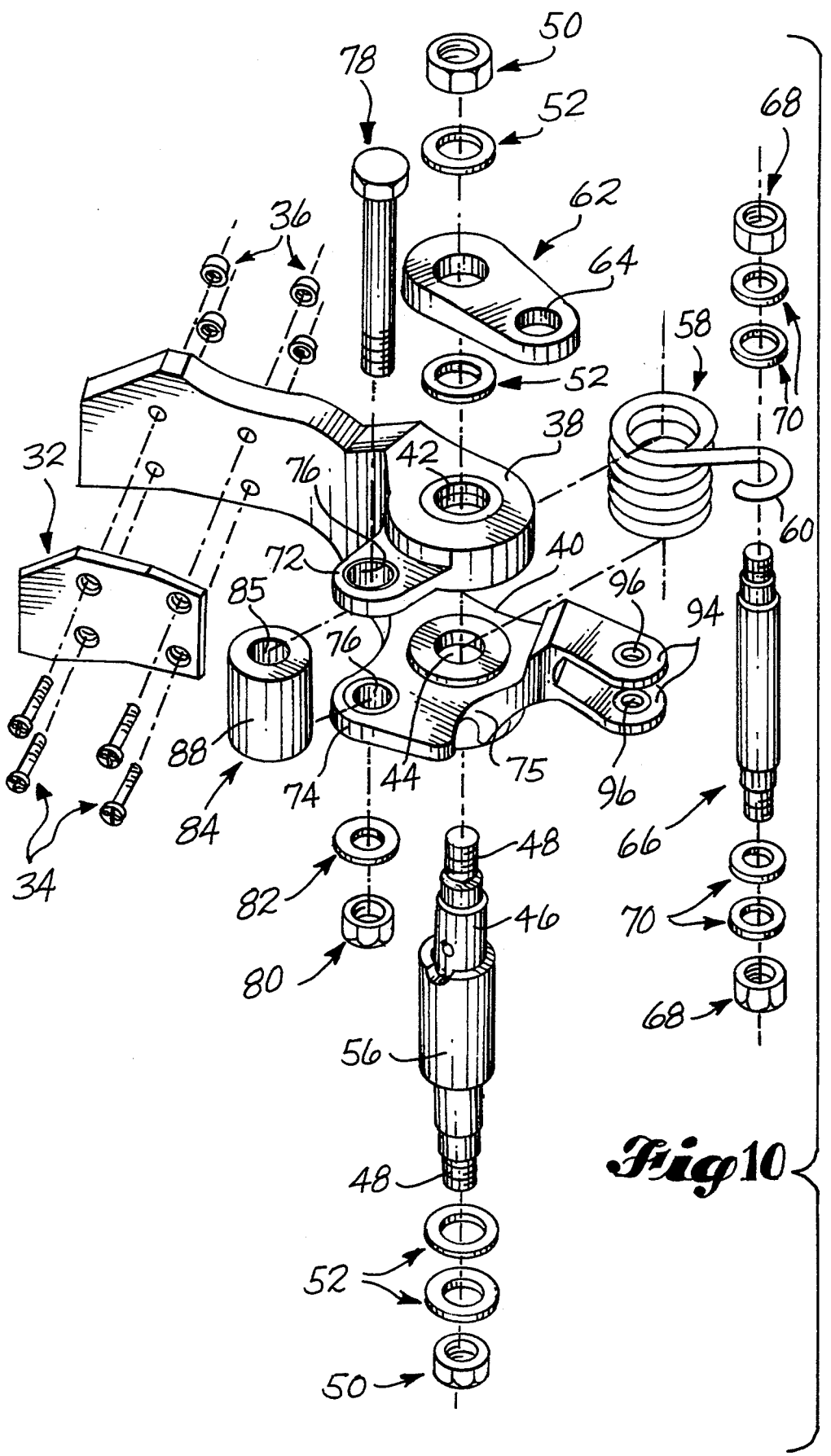
FIG. 10 is an exploded pictorial view of the apparatus shown in FIG. 8.
Figure 11:
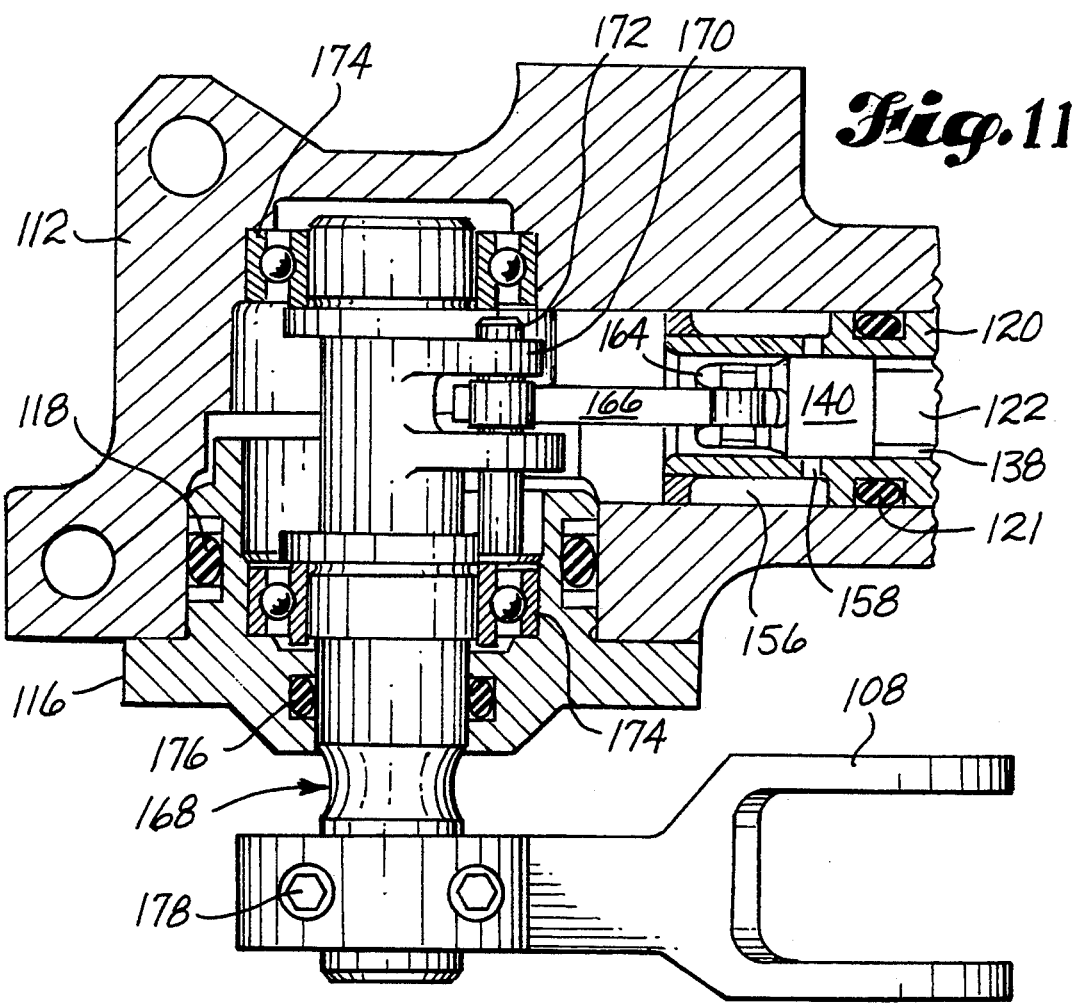
FIG. 11 is a fragmentary sectional view of an end portion of the preferred embodiment of the spread valve of the invention, with parts shown in elevation.
Figure 12:
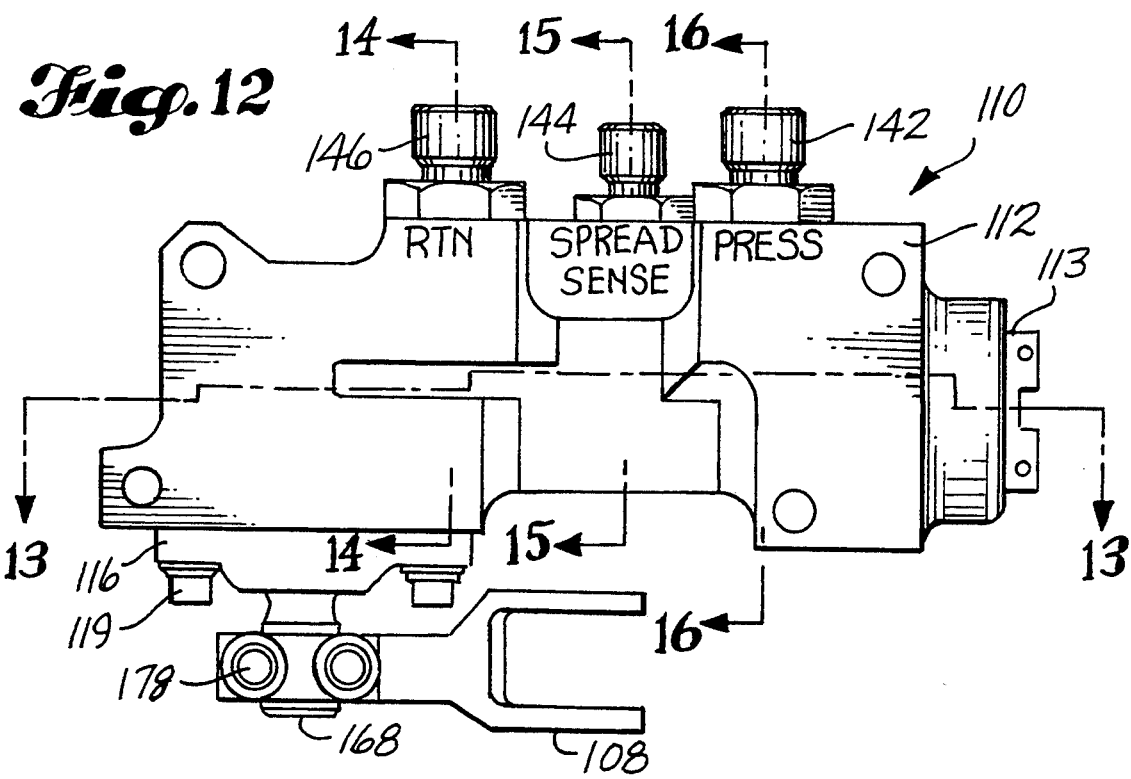
FIG. 12 is an elevational view of the valve shown in FIG. 11.

The details of the structure of the inhibitor 28 can best be seen in FIGS. 8 and 10. The inhibitor 28 has a projecting first end that extends over the opening 8 when the inhibitor 28 is in its inhibit position, as shown in FIGS. 4 and 7 and discussed above. The projecting end is provided with a bearing plate 32 that is secured to the inhibitor body by bolts 34 and nuts 36. The plate 32 is contacted by the lug 16 as the lug 16 moves into position between the inboard lugs 6, 10. The plate 32 is made from a suitable bearing material to prevent wear of the inhibitor body and provide smooth sliding engagement between the lug 16 and the inhibitor 28. The mounting of the plate 32 by means of bolts 34 and nuts 36 enables its easy removal and replacement to simplify maintenance of the inhibitor 28. On the rear surface of the projecting end of the inhibitor 28 opposite the bearing plate 32, a stop member 30 is preferably provided to prevent overtravel of the inhibitor 28 when it is engaged by the lug 16, as shown in FIGS. 5 and 6. During normal operation, the stop member 30 does not contact any structure when the inhibitor 28 is in the engaged position. The stop member 30 may be removable to allow its replacement.

The end of the inhibitor 28 opposite the projecting end is bifurcated and has parallel spaced fingers 38, 40. Aligned openings 42, 44 in the fingers 38, 40 receive a pivot shaft 46 that defines the axis A. Referring to FIG. 10, the pivot shaft 46 has opposite threaded ends 48 that extend through the openings 42, 44 and are secured in place by nuts 50 and washers 52. A sleeve 56 surrounds the midportion of the shaft 46 between the threaded ends 48. A torsion spring 58 surrounds the sleeve 56, as shown in FIGS. 4 and 8. The spring 58 has a first end (not shown) that engages the inhibitor 28, and a second hook end 60 that is anchored to a support 54 carried by the inboard wing portion 4. The support 54 may be formed integrally with the lower inboard lug 6. An anchor member 62 is mounted on the pivot shaft 46 between the top finger 38 of the bifurcated end of the inhibitor 28 and the corresponding securing nut 50. The anchor member 62 has an opening 64 that receives an anchor bolt 66. The opposite ends of the bolt 66 are secured to the anchor member 62 and support 54 by nuts 68 and washers 70. The anchor member 62 is pivotably mounted on the pivot shaft 46 to be pivotable relative to the inhibitor 28. When the inhibitor 28 pivots in response to engagement by the wing-tip lug 16, the anchor member 62 and anchor bolt 66 remain in their stationary position. This creates torsion in the spring 58 to bias the inhibitor 28 back toward its inhibit position shown in FIGS. 4 and 7.

Each of the fingers 38, 40 of the bifurcated end of the inhibitor 28 is provided with a side lug 72, 74. The lower side lug 74 includes a stop surface 75 that contacts the anchor bolt 66 to limit movement of the inhibitor 28 toward its inhibit position (FIG. 4). The two side lugs 72, 74 together provide a means for mounting a roller 84 to pivot with the inhibitor 28 about axis A. A bolt 78 extends through aligned openings 76 in the side lugs 72, 74 and through an axial opening 85 in the roller 84. The upper end of the bolt 78 has a head formed thereon, and the lower end is secured by means of a nut 80 and a washer 82. The details of the structure of the roller 84 are shown in FIG. 9. The roller has concentric inner and outer cylindrical portions 86, 88. The outer portion 88 is supported on the inner portion 86 by a bearing 90. The outer portion 88 is freely rotatable with respect to the inner portion 86 about roller axis B for the purpose described below.

In addition to the inhibitor 28, the apparatus of the invention includes a spread valve 110 and linkage interconnecting the inhibitor 28 with the valve 110. To accomplish the interconnection, the inhibitor 28 is provided with a projecting yoke 94. The valve 110 carries a yoke 108, shown in FIGS. 4-7, 11, and 12. A connector rod 98 extends between the two yokes 94, 108. The yoke 94 on the inhibitor 28 has spaced openings 96 through which a fastener 106 is received to pivotally connect an eye 104 on an end of the rod 98 to the yoke 94. The opposite end of the rod 98 is similarly pivotably connected to the yoke 108 carried by the valve 110. The outer end of a pivot shaft 168 is secured by fasteners 178 to the end of the yoke 108 opposite the connection to the rod 98. The shaft 168 actuates the valve 110, as described further below. The rod 98 may be made adjustable, such as providing it in the form of a turnbuckle, to permit precise adjustment of the movement of the yoke 108 and the shaft 168 in response to pivoting of the inhibitor 28.

The valve 110 is shown in FIGS. 4-7 and 11-18. It can best be seen in FIGS. 11-18. The valve 110 comprises a main housing 112 having an axial bore opening onto one end of the housing 112 and having an opposite blind end. A radial bore communicates with the blind end of the axial bore. The open end of the axial bore is closed by an end cap 113 that threadedly engages the main housing 112. A retainer housing portion 116 is received into the radial bore to pivotably secure a pivot shaft 168 to the main housing 112. The retainer 116 is secured to the main housing 112 by fasteners 119. A seal 118 is positioned between the two housing portions 112, 116 to seal the interior of the valve 112.

An annular sleeve 120 is received in the axial bore and has an axial opening extending therethrough into which a valve spool 122 is received. In the assembled valve 110, the sleeve 120 is fixed in position. It serves the known purpose of facilitating machining of the valve and its various chambers and passageways while maintaining the main housing 112 as a single integral piece. The sleeve 120 has annular chambers machined on its outer circumferential surface and radial passageways extending therethrough. Seals 121 seal the interface between the sleeve 120 and the housing 112 between chambers and passageways. The outer end of the sleeve 120 receives a plug 114 that is held in position by the end cap 113. A seal 115 is positioned between the plug 114 and the inner surface of the sleeve 120.

The valve member or spool 122 is connected to the yoke 108 by means of the pivot shaft 168 and a pivot link 166 to cause the spool 122 to shift between first and second positions in response to pivoting of the inhibitor 28. The spool 122 reciprocates between a first position, shown in FIGS. 11-13 and 17, and a second position, shown in FIG. 18. The valve 110 has a pressure port 142, a sense port 144, and a return port 146. When the spool 122 is in the first position, sense port 144 is in communication with the pressure port 142 and is closed from communication with the return port 146. In the second position, the sense port 144 communicates with the return port 146 and is closed from communication from the pressure port 142. Return pressure in the sense port indicates that the wings are in their fully spread condition.

The internal structure of the valve 110, and in particular the sleeve 120 and spool 122, can best be seen in FIGS. 13–16. The end of the spool 122 adjacent the plug 114 forms a piston 124 that is provided with a seal 126 to sealingly engage the inner surface of the sleeve 120. An end chamber 128 between the piston 124 and the plug 114 is always connected to return pressure by means of an axial passageway 160 through the spool 122. Inwardly of the piston 124, the sleeve 120 has a radial shoulder 130 formed thereon. A coil spring 132 surrounds the spool 122 and has opposite ends abutting the shoulder 130 and the piston 124. The spring 132 biases the spool 122 into its first position. The machining of the inner surface of the sleeve 120 to form the shoulder 130 also forms an annular chamber 134 between the spool 122 and the sleeve 120. Inwardly of the chamber 134, the spool 122 has a land 136 that slidably engages the inner surface of the sleeve 120. Inwardly of the land 136 is an annular chamber 138 formed by a reduced diameter portion of the spool 122. A second land 140 is formed on the spool 122 on the end of the reduced diameter portion opposite the land 136.

The outer circumferential surface of the sleeve 120 is machined to form annular chambers, and radial passageways extend through the sleeve 120, to provide fluid communication between the valve ports 142, 144, 146 and the spool 122. A first annular groove on the sleeve 120 forms an annular chamber 148 that communicates with the pressure port 142. Two axially spaced sets of radial passageways extend from the annular chamber 148 to the inner surface of the sleeve 120. Each set includes four circumferentially spaced passageways. The first set 150 extends from the annular chamber 148 to the annular chamber 134 in which the spring 132 is positioned. When the spool 122 is in the first position shown in FIGS. 11–13 and 17, the second set 152 communicates the annular chamber 148 with the chamber 138 formed by the reduced diameter portion of the spool 122. The spread sense port 144 is positioned between the pressure port 142 and the return port 146 and communicates with a second annular chamber 154 formed by a circumferential groove on the sleeve 120. The chamber 154 communicates with the chamber 138 surrounding the spool 122 via radial passageways 155. The return port 146 communicates with a third annular chamber 156 formed by machining the outer surface of the sleeve 120. Radial passageways 158 extend inwardly from the chamber 156 to the inner surface of the sleeve 120. Axial passageways 159 extend from the chamber 156 to the space to the left (as shown) of the spool 122 so that the left end of the spool and the adjacent left portion of the valve bore are always connected to return.

The spool 122 is mechanically moved between its first and second positions by movement of the inhibitor 28 via the linkage interconnecting the inhibitor 28 and the spool 122. Referring to FIGS. 4–7, pivoting movement of the inhibitor 28 pivots the connector rod 98 and the valve yoke 108 to thereby pivot the pivot shaft 168, best seen in FIGS. 11 and 13. The pivot shaft 168 is received into the radial bore in the valve housing 112 through an opening in the retainer 116. A seal 176 seals the interface between the shaft 168 and the retainer 116. The inner portion of the shaft 168 is rotatably supported in the housing 112 and retainer 116 by bearings 174. The shaft 168 has two projecting lugs that form a yoke 170. One end of the pivot link 166 extends into the yoke 170 and is pivotally secured thereto by a pin 172. The opposite end of the link 166 is pivotally secured to an end portion 164 of the spool 122 by a clevis/pin connection. The link 166 converts pivotal movement of the shaft 168 into translational movement of the spool 122 in the sleeve 120.

The two positions of the spool 122 are shown schematically in FIGS. 17 and 18. FIG. 17 shows the spool position when the inhibitor 28 is in its inhibit position shown in FIGS. 4 and 7. The pressure port is in communication with the annular chamber 134 to urge the spool 122 toward the right (as shown). The area difference between the surfaces exposed to the pressure on the land 136 and the piston 124 results in the biasing force in the rightward direction. The pressure port is also in communication with the spread sense port via passageway 152, annular chamber 138, and passageway 155. Communication between the return port and the spread sense port is blocked by land 140 which is adjacent to the inner radial end of passageway 158.

FIG. 18 shows the second position of the spool 122 in which the spool has shifted to the left (as shown). Movement of the spool 122 has compressed the spring 132 to create a biasing force resisting the pull of the interconnecting linkage on the valve spool 122. In addition, the pressure port is still in communication with annular chamber 134 so that the pressure continues to urge the spool 122 toward its first position shown in FIG. 17. Land 136 has moved into alignment with the radial end of passageway 152 to close passageway 152 and thereby cut off communication between the pressure port and the spread sense port. At the same time, land 140 has moved away from the radial end of passageway 158 so that the return port and the spread sense port are in communication via passageway 158, annular chamber 138, and passageway 155. The resulting change in pressure in the spread sense port provides a signal that the wing portions 4, 14 are in their spread position. Preferably, the linkage and the valve elements are precisely dimensioned so that communication between the spread sense port and the pressure port is not cut off until the wing portions 4, 14 are fully spread.

The apparatus shown and described herein is provided with a number of safety features to prevent an incorrect spread sense signal and premature extension of the latch pin 20. The valve 110 is designed so that it is always biased towards its first position, which indicates that the wing portions 4, 14 are not spread. As discussed above, the biasing of the valve spool 122 is accomplished mechanically via the spring 132 and by means of pressure from the pressure port acting on the piston 124 in annular chamber 134. Both ends of the spool 122 are always connected to return. The communication of the spread sense port with the return port in the spread condition reinforces the safety of the valve 110. If leakage of pressure in the valve 110 should occur so that pressure from the pressure port reaches the sense port when the spool 122 is not in its first position, the resulting incorrect signal will indicate a folded wing position so that the result of the valve failure is a delay in takeoff, which is inconvenient but not a safety hazard. On the other hand, an incorrect spread signal can only result from a major failure in the hydraulic system, such as a major leak in the valve housing or elsewhere. In such a situation, the incorrect spread signal will not create a safety hazard because the failure in the hydraulic system will shut down the aircraft and preferably will prevent extension of the latch pins.

The inhibitor 28 is also provided with safety features. The spring 58 biases the inhibitor 28 into its inhibit position shown in FIGS. 4 and 7 to block latch pin extension and help prevent a spread signal if the wing-tip lug 16 is not urging the inhibitor 28 into its engaged position shown in FIGS. 5 and 6. The biasing force of the spring 58 is reinforced by the mechanical (spring) and pressure biasing of the valve spool 122, which tend to move the inhibitor 28 into its inhibit position via the linkage between the spool 122 and the inhibitor 28. Further back-up protection to the inhibitor spring biasing is provided by positive return of the inhibitor 28 to its inhibit position by withdrawal of the wing-tip lug 16 into its folded position. A cam 92 is formed on the lug 16 and is positioned to engage the roller 84 as the lug 16 moves from its spread position to its folded position. This relative positioning is illustrated by the broken lines X, Y in FIG. 6. As can be seen therein, if the inhibitor 28 remains in its engaged position as the lug 26 withdraws, the cam surface 92 will contact the outer circumferential surface of the roller 84 to positively cause pivoting of the inhibitor 28 back into its inhibit position. When the wing tips are again spread, the cam 92 does not contact the roller 84 as the lug 16 moves into alignment with the lugs 6, 10 since the roller 84 is pivoted out of the pathway of the lug 16, as shown in FIG. 7. The safety feature of the combination of the cam 92 and the roller 84 ensures resetting of the inhibitor 28 and the return of the system to a condition in which folded wing tips are indicated even if the spring biasing of the inhibitor 28 fails or the inhibitor sticks or jams.

The apparatus of the invention is designed so that other types of failures in the apparatus will not result in an incorrect spread signal. If there is a failure in any of the linkage, the mechanical and fluid pressure biasing of the valve 110 will cause a folded condition to continue to be indicated. Similarly, if the projecting end of the inhibitor 28 is damaged or broken, movement of the lug 16 into its spread position will simply fail to create a spread signal.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. In an aircraft folding wing system of a type having first and second wing portions hingedly connected to each other, said portions including first and second lugs, respectively, each said lug having an opening, and said lugs being movable relative to each other along a spread pathway between a folded position and a spread position in which said openings are aligned for receiving a latch pin, apparatus for sensing said spread position, comprising:

an inhibitor pivotably mounted on said first portion to pivot between an inhibit position in which it extends into said pathway and an engaged position; said inhibitor being positioned to be engaged by said second lug, as said lugs move from said folded position to said spread position, and to be moved thereby from said inhibit position to said engaged position;

a spread valve having a sense port, a pressure port, a return port, and a valve member; said valve member being movable between a first position in which said sense port is in communication with one of said pressure and return ports and is closed from communication with the other of said pressure and return ports, and a second position in which said sense port is in communication with said other of said ports and is closed from communication with said one of said ports; and linkage interconnecting said inhibitor with said valve member to cause said valve member to be mechanically moved from said first position to said second position by movement of said inhibitor from said inhibit position to said engaged position.

2. The apparatus of claim 1, comprising biasing means for biasing said inhibitor into said inhibit position.

3. The apparatus of claim 1, comprising a spring that engages said inhibitor to bias said inhibitor into said inhibit position.

4. The apparatus of claim 1, in which, when said inhibitor is in said inhibit position, said inhibitor extends over a portion of said opening in said first lug to inhibit movement of a latch pin through said opening in said first lug.

5. The apparatus of claim 1, in which said sense port is in communication with said pressure port when said valve member is in said first position.

6. The apparatus of claim 5, comprising biasing means for biasing said valve member into said first position.

7. The apparatus of claim 6, comprising means carried by said second lug for engaging said inhibitor and moving said inhibitor into said inhibit position as said lugs move toward said folded position.

8. The apparatus of claim 5, in which said valve member has opposed pressure surfaces continuously exposed to said pressure port and said return port, respectively, to continuously urge said valve member toward said first position.

9. The apparatus of claim 8, comprising a spring that engages said valve member to bias said valve member into said first position.

10. The apparatus of claim 1, comprising means carried by said second lug for engaging said inhibitor and moving said inhibitor into said inhibit position as said lugs move toward said folded position.

11. The apparatus of claim 10, comprising biasing means for biasing said valve member into said first position.

12. The apparatus of claim 10, in which said valve member has opposed pressure surfaces continuously exposed to said pressure port and said return port, respectively, to continuously urge said valve member toward said first position.

13. The apparatus of claim 12, comprising a spring that engages said valve member to bias said valve member into said first position.

14. The apparatus of claim 1, comprising a first abutment surface carried by said second lug, and a second abutment surface mounted to pivot with said inhibitor; said first abutment surface being positioned to be brought into abutment with said second abutment surface, as said lugs move toward said folded position, to move said inhibitor into said inhibit position.

15. The apparatus of claim 14, in which said first abutment surface comprises a cam surface, and said second abutment surface comprises an outer surface of a roller.

16. The apparatus of claim 15, in which said inhibitor is mounted to pivot between said inhibit position and said engaged position about a pivot axis, and said roller is freely rotatable about a roller axis substantially parallel to said pivot axis and pivots about said pivot axis along with said inhibitor.

17. The apparatus of claim 1, comprising biasing means for biasing said valve member into said first position.

18. The apparatus of claim 1, in which said valve member has opposed pressure surfaces continuously exposed to said pressure port and said return port, respectively, to continuously urge said valve member toward said first position.

19. The apparatus of claim 18, comprising a spring that engages said valve member to bias said valve member into said first position.

20. The apparatus of claim 1, comprising a spring that engages said valve member to bias said valve member into said first position.

21. In a system of a type having first and second structures hingedly connected to each other, said structures including first and second lugs, respectively, each said lug having an opening, and said lugs being movable relative to each other along a spread pathway between a folded position and a spread position in which said openings are aligned for receiving a latch pin, apparatus for sensing said spread position, comprising:
   an inhibitor pivotably mounted on said first structure to pivot between an inhibit position in which it extends into said pathway and an engaged position; said inhibitor being positioned to be engaged by said second lug, as said lugs move from said folded position to said spread position, and to be moved thereby from said inhibit position to said engaged position;
   a spread valve having a sense port, a pressure port, a return port, and a valve member; said valve member being movable between a first position in which said sense port is in communication with one of said pressure and return ports and is closed from communication with the other of said pressure and return ports, and a second position in which said sense port is in communication with said other of said ports and is closed from communication with said one of said ports; and
   linkage interconnecting said inhibitor with said valve member to cause said valve member to be mechanically moved from said first position to said second position by movement of said inhibitor from said inhibit position to said engaged position.

22. The apparatus of claim 21, comprising a first abutment surface carried by said second lug, and a second abutment surface mounted to pivot with said inhibitor; said first abutment surface being positioned to be brought into abutment with said second abutment surface, as said lugs move toward said folded position, to move said inhibitor into said inhibit position.

23. The apparatus of claim 22, in which said first abutment surface comprises a cam surface, and said second abutment surface comprises an outer surface of a roller.

24. The apparatus of claim 23, in which said inhibitor is mounted to pivot between said inhibit position and said engaged position about a pivot axis, and said roller is freely rotatable about a roller axis substantially parallel to said pivot axis and pivots about said pivot axis along with said inhibitor.

25. In an aircraft folding wing system of a type having first and second wing portions hingedly connected to each other, said portions including first and second lugs, respectively, each said lug having an opening, and said lugs being movable relative to each other between a folded position and a spread position in which said openings are aligned for receiving a latch pin, apparatus for inhibiting premature extension of the latch pin, comprising:
   an inhibitor pivotably mounted on said first portion to pivot between an inhibit position in which it extends over a portion of said opening in said first lug to inhibit extension of the latch pin through said opening in said first lug, and an engaged position; said inhibitor being positioned to be engaged by said second lug, as said lugs move from said folded position to said spread position, and to be moved thereby from said inhibit position to said engaged position; and
   a first abutment surface carried by said second lug, and a second abutment surface mounted to pivot with said inhibitor; said first abutment surface being positioned to be brought into abutment with said second abutment surface, as said lugs move toward said folded position, to move said inhibitor into said inhibit position.

26. The apparatus of claim 25, in which said first abutment surface comprises a cam surface, and said second abutment surface comprises an outer surface of a roller.

27. The apparatus of claim 26, in which said inhibitor is mounted to pivot between said inhibit position and said engaged position about a pivot axis, and said roller is freely rotatable about a roller axis substantially parallel to said pivot axis and pivots about said pivot axis along with said inhibitor.

28. The apparatus of claim 25, comprising a spring that engages said inhibitor to bias said inhibitor into said inhibit position.

* * * * *